United States Patent [19]

Davies et al.

[11] 3,862,790

[45] Jan. 28, 1975

[54] ELECTRICAL INTERCONNECTORS AND CONNECTOR ASSEMBLIES

[75] Inventors: Terrence Ardern Davies, Horton; Geoffrey Michael Garner, Northampton; Rodney John Hurditch, Blisworth; James Thomas Lynch, Towcester; Tony Edward Lanham, Duston; Kenneth Fearnside, Cheltenham, Gloucester, all of England

[73] Assignee: Plessey Handel und Investments A.G., Zug, Switzerland

[22] Filed: July 10, 1972

[21] Appl. No.: 270,384

[30] Foreign Application Priority Data

| | | |
|---|---|---|
| July 22, 1971 | Great Britain | 34410/71 |
| Aug. 7, 1971 | Great Britain | 37223/71 |
| Nov. 20, 1971 | Great Britain | 54007/71 |
| Dec. 15, 1971 | Great Britain | 58170/71 |

[52] U.S. Cl. .......... 339/17 LM, 174/68.5, 339/18 C

[51] Int. Cl. .......... H05k 1/04

[58] Field of Search .......... 339/17, 18, 19, 95, 59, 339/154, 278, 218, 219, 275, 156, 176, 174; 174/68.5

[56] References Cited

UNITED STATES PATENTS

| | | | |
|---|---|---|---|
| 2,956,141 | 10/1960 | Smith | 339/17 LM |
| 3,077,511 | 2/1963 | Bohrer et al. | 339/17 E X |
| 3,134,930 | 5/1964 | Wright, Jr. | 339/17 E X |
| 3,364,300 | 1/1968 | Bradham, III | 339/18 C X |
| 3,569,607 | 3/1971 | Martyak et al. | 339/17 E X |
| 3,634,807 | 1/1972 | Grobe et al. | 339/18 R X |
| 3,638,163 | 1/1972 | Loosme | 339/18 C X |
| 3,680,037 | 7/1972 | Nellis et al. | 339/18 C X |

*Primary Examiner*—Roy D. Frazier
*Assistant Examiner*—Terrell P. Lewis
*Attorney, Agent, or Firm*—Scrivener Parker Scrivener & Clarke

[57] ABSTRACT

An electrical interconnector for interconnecting individual pads (1) of a first row of pads with corresponding pads (1) of a second row of pads parallel to the first row, which comprises a number of separate parallel conductors (3) running across the space *s* between the rows of pads, and insulating material 4 retaining the conductors in position relatively to each other, such that the separation *p* of adjacent conductors in the direction of the rows is less than the dimension *a* of a pad measured in the same direction. Accurate positioning of the interconnector relatively to the pads is not necessary. Two applications of the interconnector to stacks of insulating boards (2) carrying integrated circuit chips are described, one application also offering the facility of connection to circuits external of the stack.

4 Claims, 13 Drawing Figures

ELECTRICAL INTERCONNECTORS AND CONNECTOR ASSEMBLIES

This invention relates to electrical interconnectors.

It is known to mount electrical integrated circuit chips in insulating boards, and to provide electrical connection to the chips by means of pads of conductive material. The pads are generally disposed side by side in a row near to and parallel with an edge of the board. In this disposition the pads serve as one half of a multiple plug and socket connection device, by which the pads are afforded connection to cables and thence to other apparatus not mounted on the board, for example, power sources. The pads are connected to the chips by conductive leads, and if it is necessary to connect a pad on one face of the board with a chip on the opposite face, a hole is made in the board and the relevant lead is passed through the hole. If one board should be inadequate as a mounting for a given number of chips, two or more boards must be used, and electrical interconnection between chips on different boards becomes necessary.

According to the invention there is provided an electrical interconnector, capable of interconnecting individual pads of a first row of pads with corresponding pads in a second row of pads spaced from and parallel to the first row, which interconnector comprises a number of separate conductors running substantially parallel to each other across the space between the rows of pads, and insulating material retaining the separate conductors in position relatively to each other such that the separation of adjacent conductors in the direction of said rows is less than the dimension of a pad measured in the direction of the rows.

An interconnector according to the invention, and methods of making such interconnectors, will now be described with reference to the accompanying drawings in which.

The drawings are not to scale, and are greatly enlarged. As a guide to the dimensions involved, it is intended that the pitch of the contact pads should be of the order of 0.02 inches.

Figure 1:
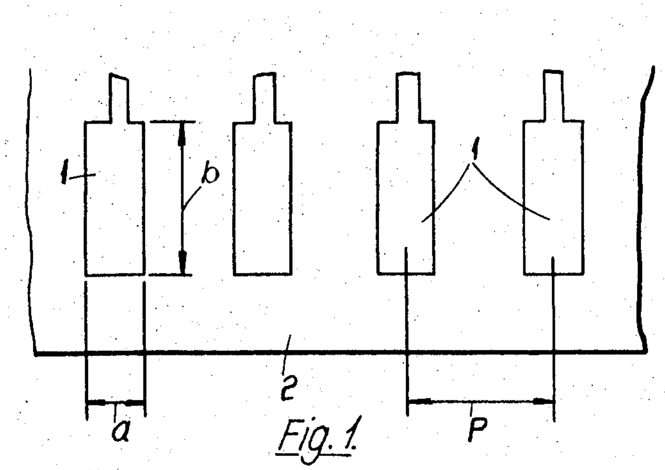
FIG. 1 shows a known arrangement of contact pads on an insulating board.

In the known arrangement shown in FIG. 1, contact pads 1 are arranged in a row near to and parallel with an edge of an insulating board 2. The pitch of the pads is P, and they have a minimum dimension, measured along the row, denoted by a.

Figure 2:
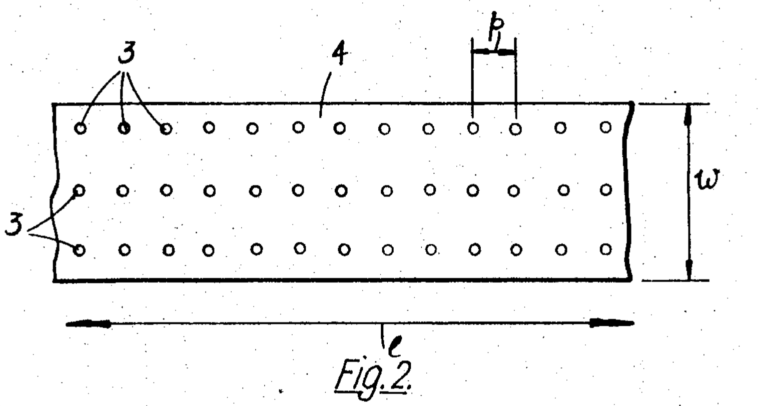
FIG. 2 is a plan view of an interconnector according to the invention.
Figure 3:
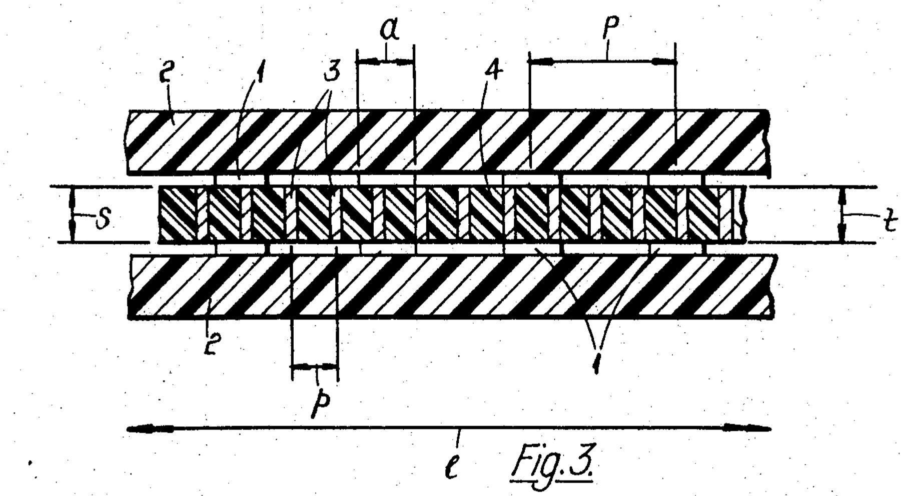
FIG. 3 shows in sectional elevation the interconnector of FIG. 2 between two insulating boards of a stack of insulating boards, FIG. 4, 5 show in sectional elevation and plan respectively a first former suitable for making the interconnector of FIG. 1.

As shown in FIGS. 2, 3 an interconnector according to the invention comprises a number of conductors 3 running substantially parallel to each other from one face to an opposite face of a block insulating material.

When one insulating board 2 is inadequate as a mounting for a given number of integrated circuit chips, the chips are mounted on two or more boards. It is convenient to arrange the boards horizontally and parallel to each other in stacks. FIG. 3 shows an interconnector between two insulating boards 2 of a stack. The upper board 2 carries contact pads 1 on its lower surface, and the lower board 2 carries contact pads 1 on its upper surface. The pads 1 are disposed on a board 2 in a row, in a known manner near to and parallel with an edge of the board. The boards 2 are positioned relatively to each other so that the rows of pads 1 are parallel with each other and are spaced from each other by a distance $s$. The pitch of the pads in both rows is the same, namely P, and the pads in the rows are in vertical alignment. All the pads have the same dimensions, namely a first dimension $a$ measured in the direction of the row, and a second dimension $b$ (FIG. 1) measured normal to the row. The block 4 of the interconnector has a thickness $t$ equal to the distance $s$ between the contact pads on two boards.

In FIG. 3 the pads 1 are shown as standing proud of the boards 2, but this is an exaggeration for illustrative purposes only. In practice a pad 1 is formed by vapour deposition or some comparable process, and the depth of a deposit which forms a pad is negligible in relation to the thickness $t$.

The length $l$ of the block 4 slightly exceeds the length of a row of contact pads. The width $w$ of the block 4 slightly exceeds the dimension $b$ (FIG. 1) of the pads 1. In the block 4, the conductors 3 extend across the thickness $t$, that is across the distance $s$ between the contact pads on the two boards. Along the length $l$ of the block 4, the conductors 3 are pitched at a pitch $p$. The pitch $p$ of the conductors 3 is less than the first dimension $a$ of the pads 1. The interconnector is held in position between boards 2 by clamping pressure applied to the boards. In this position, with the pitch $p$ less than the dimension $a$, there is always at least one conductor 3 interconnecting a pad 1 on the lower board 2 with the corresponding vertically aligned pad 1 on the upper board 2. Accurate positioning of the interconnector is not necessary. Conductors 3 which do not touch contact pads 1 are ineffective. As will be seen later, the width $w$ of the block 4 is made up in layers, each layer containing a row of conductors 3 pitched at the pitch $p$. Each layer increases, by at least one, the number of conductors 3 interconnecting corresponding pads 1. The conductors 3 are conveniently made from wire, and the ends of the conductors may be gold plated to reduce contact resistance with the pads 1. The material of the insulating block 4 should yield under the clamping pressure sufficiently to prevent impairing contact between a pad 1 and a conductor 3.

A stack may comprise many boards 2 ranged one above the other. There will be an interconnector between each pair of adjacent boards, and all except the top and bottom boards will have contact pads on both their upper and lower surfaces. Preferably, in order to distribute clamping pressure evenly over all the contact pads, the boards 2 are square and have contact pads along each side of the square. With this arrangement there will be four interconnectors between each pair of adjacent boards. By providing dummy filler connections at the corners of the square, the four interconnectors may be combined into a single piece-part.

Figure 4:
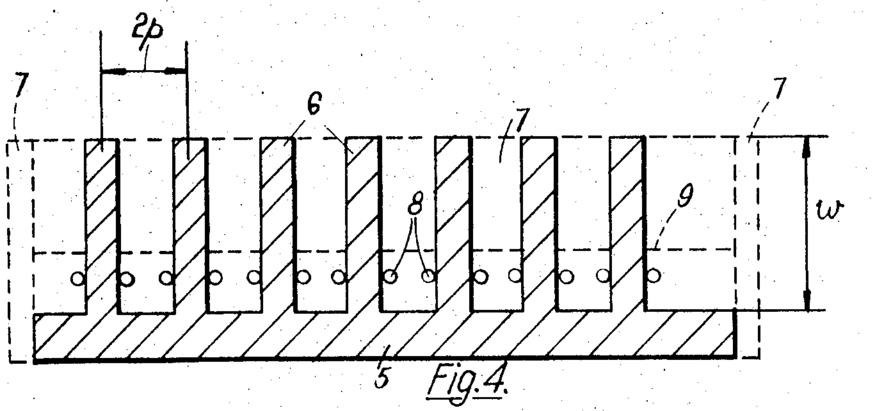
Figure 5:
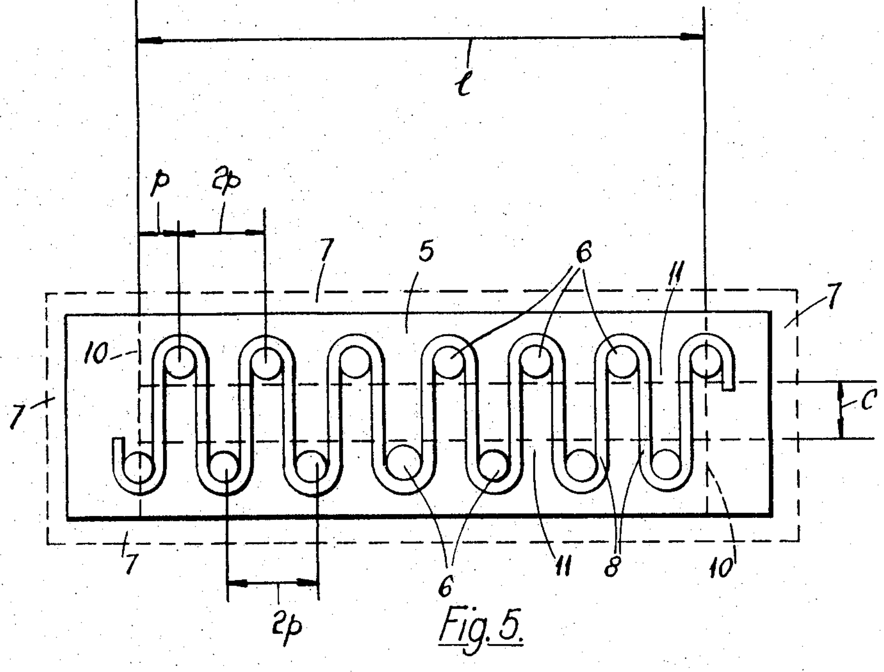

An interconnector as just described can be made by means of a former shown in FIGS. 4, 5. The former consists of a plate 5 having two parallel rows of pillars 6 normal to one face. The former can be enclosed by a wall 7. The pillars 6 are conveniently made from relatively stout wire, and are secured to the plate 5 in any convenient way. The wall 7 may or not be permanently attached to the plate 5. In each row the pitch of the pillars 6 is twice that required for the conductors 3, the pillars in the two rows being staggered relatively to each other by half their pitch, that is by the distance *p*. The distance, measured parallel to the rows of pillars, from the pillar at one end of one row to the pillar at the other end of the opposite row is at least the length *l* required for the interconnector. The rows of pillars are spaced from each other so as to leave a clear distance *c* between them. The distance *c* is at least equal to the thickness *t* of the interconnector. A wire is then chosen of a material and diameter suitable to form a conductor 3. The diameter of the pillars 6 is related to the diameter of a wire so that, when the wire is laced around the pillars of each of the rows alternately, as shown at 8, the lengths of wire which extend from pillar to pillar are all parallel to each other.

To use a former, a wire suitable to form a conductor 3, is laced around the first pillar 6 of one row, the first pillar of the other row, the second pillar of the said one row, the second pillar of the said other row and so on as shown most clearly at 8 in FIG. 5. The wire is laced clear of the plate 5, the clearance being the distance by which the conductors 3 are to be inset into the block 4. The wall 7 is then placed around the plate 5 (if it is not already in position) to form a trough whose depth is equal to the width *w* required for the block 4. A suitable insulating material, for instance rubber, is poured into the trough in liquid form, until the wire 8 is covered. The material is allowed to set, so forming a layer whose upper surface is represented by the broken line 9 in FIG. 4. The wall 7 is then removed, and the lacing and pouring process is repeated to form a second and subsequent layers until the trough is full. The layers are allowed to bind together into one mass of insulating material. The mass is withdrawn from the former by being lifted upwardly to clear the pillars 6. The binding of the layers may be assisted by heat applied before or after the mass is withdrawn from the former. Finally the mass is trimmed to the required dimensions by cutting along the lines 10, 11 of FIG. 5. The cuts 10 dispose of the ends of the wire 8, and the cuts 11 dispose of the portions of the wire 8 which loop around the pillars 6. The trimming leaves a block 4 of insulating material which has a number of layers in each of which a row of conductors 3 run from one face to an opposite face, the conductors of a row being separated from each other by a pitch *p* measured in the direction of the length of *l* of the block. The spacing of the rows of conductors 3 is determined by the thickness of the layers, which, in turn, is dependent on the depth to which the rubber is poured at the pouring stage. In the present example this spacing is not critical, but, as will be discussed in connection with FIGS. 10 to 11*c*, the spacing can be important in certain circumstances. If the former is appropriately dimensioned, the trimmed block 4 has the dimensions required for an interconnector. However, one or more of the dimensions of the former may be greater than is required. In this event an interconnector of the required dimensions may be cut from the trimmed block. For example, if the distance *c* is a multiple of the thickness *t*, an interconnector of the required thickness is obtained by slicing the trimmed block parallel to the lines 11.

An interconnector may alternatively be made by means of a rod-shaped former (not shown). The rod has a length L (FIGS. 6 to 8) which is at least the length required for an interconnector. The rod has a circumference C which is large in relation to the thickness *t* required for the interconnector. As before, the interconnector is made a layer at a time. Using the former, the wire 8, from which conductors 3 are formed, is wound as a helix of pitch *p*. Insulating material is applied alternately with the winding operation. Most conveniently the material has a plastic consistency at the time of application. After application the material is allowed to set. Many materials known chemically as plastics are suitable for use as an insulating material. When the applied material has been allowed to set, the process is repeated to form second and subsequent layers, until a hollow cylinder 12 (FIG. 7) is formed, whose wall has a thickness equal to the width *w* (FIGS. 2, 6) required for the interconnector. The layers are allowed to bind, and the cylinder 12 is withdrawn from the former (not shown). The binding of the layer may be assisted by heat applied either before or after the cylinder is withdrawn from the former. An interconnector (FIG. 6) is obtained by cutting the hollow cylinder 12 longitudinally along two radial planes which substend an arc equal to the thickness *t* required for the interconnector. The severed portion is withdrawn (see FIGS. 6, 7) and constitutes the interconnector. An interconnector formed in this way is not a true parallelepiped, but if the circumference C of the former is large in relation to the thickness *t*, the interconnector is acceptable.

The hollow cylinder 12 may also be formed by winding insulating tape and lengths of wire 8 alternately on the rod-shaped former (not shown) starting with the insulating tape. Another alternative is to cover the wire 8 with insulation and to wind the insulated wire on to the former. If this is done, the thickness of the insulation covering the wire 8 must be such as to accord with the pitch *p* to which the helix is wound. The surfaces of the insulation material which come into contact with each other are made to bind to each other, e.g., by means of heat or adhesive, so as to form a mass.

Figures 6, 7, 8, 9:
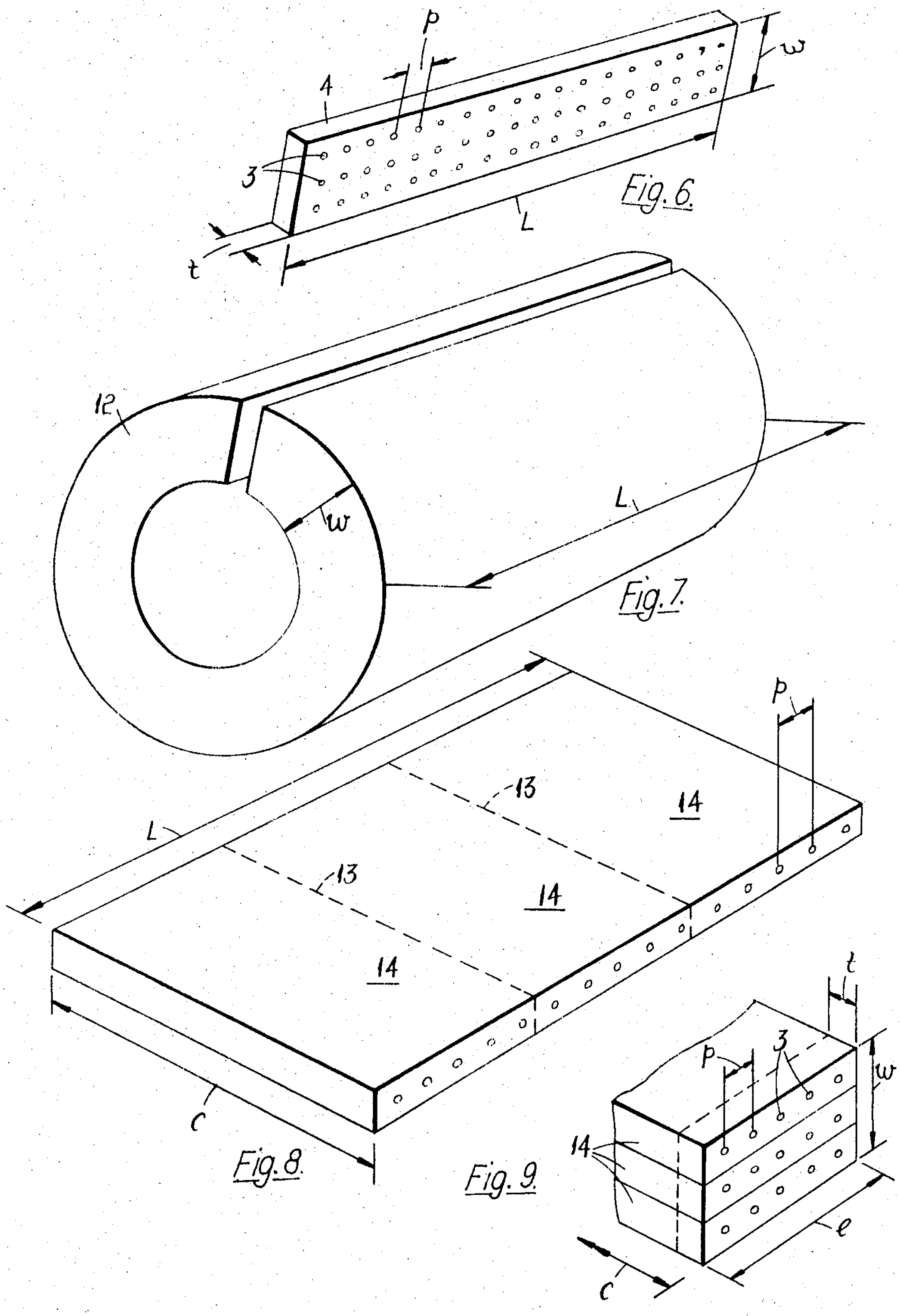
FIGS. 6 to 9 illustrate alternative methods of making an interconnector using a second former.

An interconnector which is a true parallelepiped can be made by means of a rod-shaped former. With this method, a layer is withdrawn from the former as soon as it has been formed. On withdrawal, the layer is in the form of a hollow cylinder. After withdrawal, the cylinder is cut longitudinally and flattened to form a plate as shown in FIG. 8. The plate is then cut at right angles to its length, as indicated by the broken lines 13, into a number of sections 14. The sections 14 are laid on top of each other as shown in FIG. 9, to form a block, all the conductors 3 running parallel to each other. The sections 14 are then bound to each other in any suitable way, for example, by use of adhesive. An interconnector is obtained by slicing the block parallel to what was the length of the hollow cylinder 12. The thickness of the slice is the thickness *t* required for the interconnector. While an interconnector made in this way is a true parallepiped, the conductors 3 are not truly normal to the faces of the interconnector at which they are exposed. The divergence from normality is due to the fact that the wire 8, from which the conductors 3 are formed, was wound as a helix. But the divergence may be ignored if the circumference C of the hollow cylinder 12 is large in relation to the thickness *t* of the interconnector.

As already explained, an interconnector, when in use, is subjected to clamping pressure. This pressure may tend to cause the conductor 3 to separate from the material of the insulating block 4, a tendency which is undesirable because the spacing of the conductors 3 may be lost. This tendency may be reduced by coating the surface of each conductor 3 — excluding the end faces — with a material which forms a bond between the conductors and the insulating block. The coating enhances the retaining action of the material of the insulating block. A suitable material for the coating is known by the name "Eccoprime PR—1." This material is particularly suitable if the insulating block 4 is made of urethane rubber of the type known as "Stycast CPC 16" manufactured by Emerson and Cuming.

By means of an interconnector according to the invention, it is possible to provide short interconnection distances between parts of a circuit requiring interconnection, a facility which has appreciable advantages in certain types of computer, such as those in which electronic devices are operated at high speeds.

Figure 10:
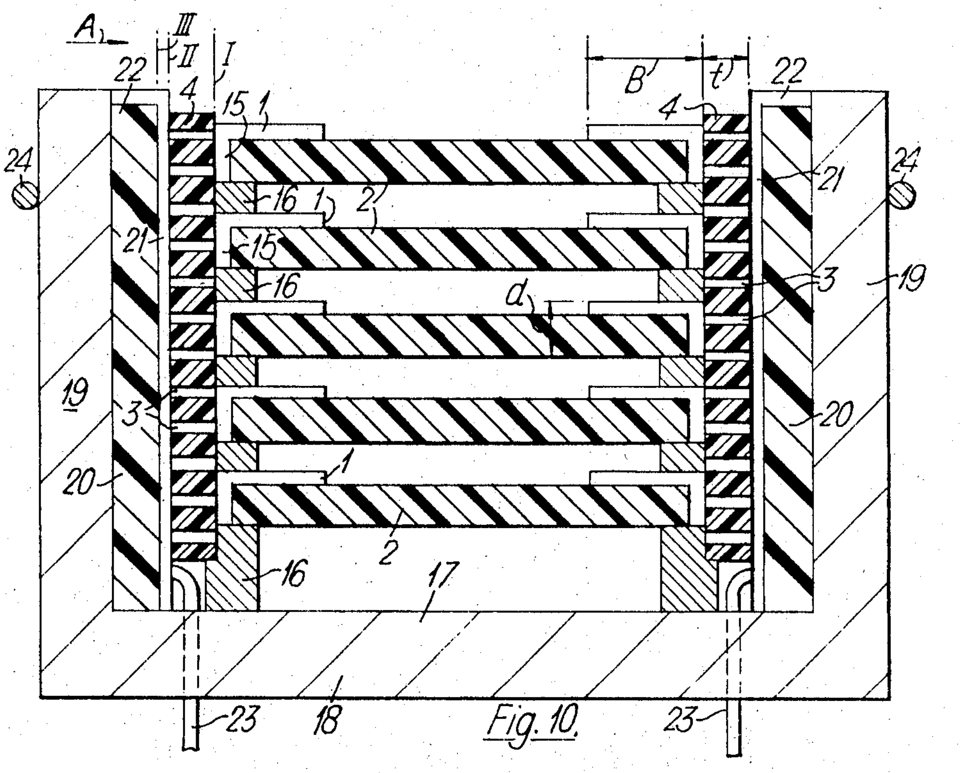
FIG. 10 is a sectional view showing an alternative method of employing an interconnector in association with a stack of insulating boards.
Figures 11A, 11B, 11C:
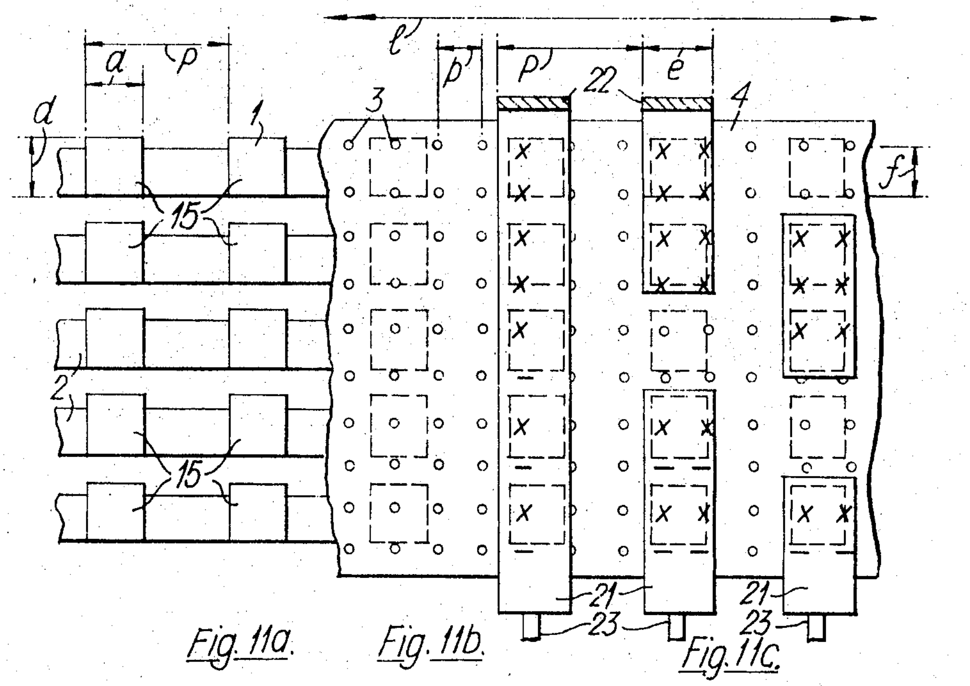
FIGS. 11*a*, 11*b*, 11*c*, are views at the planes I, II, III respectively of FIG. 10 looking in the direction of the arrow A.

In a stack of insulating boards 2, as shown in FIGS. 10 to 11*c*, the pads 1 are brought to the edges of the boards 2 by increasing the second dimension *b* (FIG. 1) to a value B (FIG. 10), the pads 1 being angled at the edge of the board 2 and continued down a side of the board to form a land 15 corresponding to each pad 1. Measured along the edge of a board, the lands 15 have the same first dimension *a* and pitch P as the pads 1. Conveniently the lands 15 extend for the full depth *d* of a board 2. The pads 1 and their lands 15 are ranged along two opposite edges of a board 2, and the boards 2 are arranged horizontally one above the other in a stack. If the lands 15 extend the full depth *d* of the boards, insulating spacers 16 are used to prevent unwanted physical and electrical contact being set up inadvertently. The stack of boards 2 is placed on the floor 17 of a trough-like container 18. The container 18 has a pair of opposed walls 19, and the lands 15 face these walls. The boards 2 are stacked with corresponding lands 15 in vertical alignment. Therefore, when viewed in the direction of the arrow A (FIG. 10), the lands 15 in the plane 1 present a co-ordinate array of rows and columns, of which the lands 15 of a board 2 constitute a row. Between a wall 19 and the lands 15 which face it, an insulating plate 20 is positioned. The plate 20 lies against the wall 19 and extends for the full length and depth of the trough-like container 18. On its exposed face the plate 20 carries a pattern of conductive strips 21 running parallel to each other from the floor 17 of the trough-like container 18 to or towards the open top of the trough. The strips 21 correspond to the columns of the crossed array of lands 15. Where a strip 21 reaches the top of the exposed face of the plate 20, the strip is angled and arranged to extend over the uppermost face of the plate, so as to provide a contact area 22 which is readily accessible to a probe (not shown) when testing is necessary. The strips 21 have a width *c* which is equal to the first dimension *a* of the pads 1 and lands 15. In FIGS. 11*b*, 11*c* the width *c* is drawn greater than the dimension *a*, but this is done for illustrative convenience only. The pitch of the strips 21 is the same as that of the pads 1 and lands 15, namely P. Conductors 23 extend through holes in the floor 17 of the container 18 and connect the strips 21 to external circuitry. An interconnector comprising substantially parallel conductors 3 in an insulating block 4 is placed between the strips 21 and the lands 15. The interconnector is dimensioned so as to cover all the lands 15 of an array. The interconnector interconnects the lands 15 of each row with corresponding areas of the conductive strips 21. The interconnector is held in position by pressure from a wire clamping spring 24, which urges the walls 19 towards each other.

Since the first dimension *a* of the lands 15 is the same as that of the pads 1, the pitch *p* of the conductors 3 of an interconnector bears the same relation to the lands 15 as it does to the pads 1. Consequently there is no need to position the interconnector accurately in the horizontal plane in order to ensure that there is at least one conductor 3 in contact with each land 15 of a row of the array. If the space *f* between adjacent rows of conductors 3 is likewise made less than the depth *d* of a land 15, there is no need for the interconnector to be accurately positioned in the vertical plane in order to ensure that there is at least one conductor 3 in contact with each land 15 in the columns of the array. In FIGS. 11*a* to 11*c* the lands 15 are square. Therefore the space *f* between adjacent rows of conductors 3 is made equal to the pitch *p* of the conductors in a row. This offers the advantage that accidental turning of the interconnector through a right angle, prior to insertion into the container 18, has no deleterious consequences. If the lands 15 are not square, the same advantage may be obtained by making the space *f* and pitch *p* equal to each other and less than the shorter of the first dimension *a* and the depth *d*.

Two columns of an array of lands 15 are shown in FIG. 11*a*. In FIGS. 11*b*, 11*c*, other columns are obscured by the insulating block 4 of an interconnector, whose conductors 3 appear clearly in FIG. 11*b*. In FIG. 11*c* some of the conductors 3 are obscured by conductive strips 21 carried by the insulating plate 20 (FIG. 10). Of the obscured conductors, those which make contact with a land 15 at one end and with a strip 21 at the other end are depicted by a cross. The remaining obscured conductors are depicted by hypens. In FIG. 11*c* the left-hand strip 21 extends the entire length of a column of the array, and therefore serves to common all the lands 15 of the column. If no external connection is made to the conductor 23, the strip 21 serves as an interconnector, interconnecting circuits associated with the relevant lands 15. But if an external connection is made to the conductor 23, the strip 21 serves as a connector connecting the external circuitry to each of the circuits associated with the lands 15. Such a function of the strip 21 is clearly useful if the external circuitry includes a source of power. As shown in the centre and right-hand columns of FIG. 11*c*, a strip 21 does not need to be continuous throughout the entire length of a column. In any column, the part of a strip 21 that is in contact with a conductor 23 may be used either for interconnections between lands 15, or for connecting the lands 15 to external circuitry. A part of a strip 21 that is not in contact with a conductor 23 may be used for interconnection purposes only. It is thus apparent that the electrical facilities provided by the conductors 3 of an interconnector are determined by the pattern of strips 21 carried by an insulating plate 20, and by whether or not any external connections are made to the conductors 23. This pattern is of course determined in relation to the circuits carried by the individual boards 2 of a stack.

In FIG. 10, the lands 15 are disposed at two opposite edges of a board 2, the stack presents two arrays, and two interconnectors are used. If the lands 15 are disposed along one edge only, presenting only one array, the interconnector at the opposite edge is replaced by a dummy spacer. If the ends of the trough like container 18 are closed. lands 15 may be provided at the third and fourth edges of the boards 2, necessitating a further one or two interconnectors as the case may be. In such an event, a further spring, similar to the spring 24, is required to urge towards each other the walls that close the trough ends. Clearly this method of employing an interconnector is applicable when only one board 2 is involved.

The conductive strips 21 may be provided on the insulating plates 20 by any convenient process.

It is to be understoood that the foregoing description of specific examples of this invention is made by way of example only and is not to be considered as a limitation in its scope.

We claim:

1. An electrical circuit assembly which includes a stack of insulating boards having contact pads on their surfaces, each pad extending to an edge of a surface of a board and continuing thence for at least part of the depth of the board to form a land, the lands of a board constituting a row of a co-ordinate array; an insulating plate carrying conductive strips running perpendicular to the rows of the array and constituting columns of the array; and an interconnector between the lands and the conductive strips capable of interconnecting individual pads of a first row of pads with corresponding pads in a second row of pads spaced from and parallel to the first row, which interconnector comprises a parallipiped of insulating material having first and second surfaces capable of touching the first and second rows of pads respectively, and, extending through the insulating material from the first to the second surface, a number of spaced parallel cylindrical conductors enclosed within the parallipiped throughout their length and having their transverse end surfaces exposed, the insulating material of the parallipiped retaining the separate conductors in position relatively to each other such that the separation of adjacent conductors in the direction of said rows is less than the dimension of a pad measured in the direction of the rows, and in which the separation of adjacent conductors in a direction perpendicular to said rows is less than the dimension of a pad measured in said perpendicular direction.

2. An electrical interconnector as claimed in claim 1 in which a conductor has a coating which forms a bond between the conductor and the insulating material.

3. An assembly as claimed in claim 1 in which a conductive strip is connected to a conductor over which a connection to an external circuit can be established.

4. An assembly as claimed in claim 1 in which a conductive strip is angled at an edge of an insulating plate to provide a test contact area.

* * * * *